United States Patent
Wills et al.

(10) Patent No.: US 9,347,313 B2
(45) Date of Patent: May 24, 2016

(54) HYDRAULIC FRACTURE MONITORING USING ACTIVE SEISMIC SOURCES WITH RECEIVERS IN THE TREATMENT WELL

(75) Inventors: Peter Berkeley Wills, Calgary (CA); Samantha Grandi Karam, Rijswijk (NL); Jeffery Joseph Mestayer, Kingwood, TX (US); Gustavo Antonio Ugueto, Packen, CO (US); Jorge Louis Lopez, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 90 days.

(21) Appl. No.: 14/125,544

(22) PCT Filed: Jun. 11, 2012

(86) PCT No.: PCT/US2012/041880
§ 371 (c)(1),
(2), (4) Date: Jun. 3, 2014

(87) PCT Pub. No.: WO2012/173924
PCT Pub. Date: Dec. 20, 2012

(65) Prior Publication Data
US 2014/0290936 A1    Oct. 2, 2014

Related U.S. Application Data

(60) Provisional application No. 61/496,280, filed on Jun. 13, 2011.

(51) Int. Cl.
*E21B 47/14* (2006.01)
*E21B 43/26* (2006.01)
(Continued)

(52) U.S. Cl.
CPC ............... *E21B 47/14* (2013.01); *E21B 43/26* (2013.01); *E21B 47/02208* (2013.01); *E21B 47/082* (2013.01); *E21B 47/101* (2013.01); *G01V 2210/6122* (2013.01); *G01V 2210/646* (2013.01)

(58) Field of Classification Search
CPC ............. G01V 1/50; G01V 1/42; G01V 1/46; G01V 1/40; E21B 43/14; E21B 43/00; E21B 43/12; E21B 47/10; E21B 43/26; E21B 47/091; E21B 49/006; E21B 47/101; E21B 47/12; E21B 47/14
See application file for complete search history.

(56) References Cited

U.S. PATENT DOCUMENTS

| 2,441,720 A | 5/1948 | Roehner et al. |
| 5,619,475 A | 4/1997 | Winkler |

(Continued)

FOREIGN PATENT DOCUMENTS

| EP | 1335107 B1 | 10/2008 |
| GB | 2364380 A | 1/2002 |

(Continued)

OTHER PUBLICATIONS

PCT International Search Report, Application No. PCT/US2012/041880 dated Feb. 18, 2013.

(Continued)

*Primary Examiner* — Zakiya W Bates

(57) ABSTRACT

A method for obtaining information about a hydraulic fracturing operation in a fracture zone in a well, comprises a) providing at least one acoustic sensor in the well and at least one acoustic source, b) injecting fracturing fluid into the well so as to cause fractures in a fracture zone in the surrounding formation, c) using the acoustic source to send an acoustic signal and using the acoustic receiver to receive the signal, d) repeating step c) at least once, and e) processing the received signals using a microprocessor so as to obtain information about the fractures. The source may be at the earth's surface or in a second well. Step e) may comprise measuring first-arriving acoustic waves or measuring reflected or diffracted acoustic waves. The information gained in step e) may be used to control the injection of fracturing fluid or detect out-of-zone water injection.

14 Claims, 1 Drawing Sheet

(51) Int. Cl.
*E21B 47/022* (2012.01)
*E21B 47/08* (2012.01)
*E21B 47/10* (2012.01)

(56) References Cited

U.S. PATENT DOCUMENTS

| | | |
|---|---|---|
| 6,268,911 B1 | 7/2001 | Tubel et al. |
| 6,281,489 B1 | 8/2001 | Tubel et al. |
| 6,588,266 B2 | 7/2003 | Tubel et al. |
| 6,787,758 B2 | 9/2004 | Tubel et al. |
| 7,040,390 B2 | 5/2006 | Tubel et al. |
| 7,201,221 B2 | 4/2007 | Tubel et al. |
| 7,284,903 B2 | 10/2007 | Hartog |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 2004/0043501 A1 | 3/2004 | Means et al. |
| 2007/0215345 A1 | 9/2007 | Lafferty et al. |
| 2009/0034368 A1* | 2/2009 | Johnson .............. E21B 7/14 367/83 |
| 2009/0188665 A1 | 7/2009 | Tubel et al. |
| 2010/0107754 A1 | 5/2010 | Hartog et al. |
| 2010/0157737 A1 | 6/2010 | Miller et al. |
| 2010/0200743 A1 | 8/2010 | Forster et al. |
| 2010/0207019 A1 | 8/2010 | Hartog et al. |
| 2010/0315630 A1 | 12/2010 | Ramos et al. |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick, III |
| 2011/0292763 A1 | 12/2011 | Coates et al. |
| 2012/0017687 A1 | 1/2012 | Davis et al. |
| 2012/0018149 A1 | 1/2012 | Fidan et al. |
| 2012/0057432 A1* | 3/2012 | Hill .................. E21B 43/11857 367/81 |
| 2013/0081805 A1* | 4/2013 | Bradford et al. ........... 166/250.1 |
| 2013/0333879 A1* | 12/2013 | Rasheed .................... 166/250.1 |

FOREIGN PATENT DOCUMENTS

| | | |
|---|---|---|
| WO | 2009158630 A1 | 12/2009 |
| WO | 2010010318 A2 | 1/2010 |
| WO | WO2010010318 A2 | 1/2010 |
| WO | 2010034986 A1 | 4/2010 |
| WO | 2010136764 A2 | 12/2010 |
| WO | 2010136810 A2 | 12/2010 |
| WO | 2011010110 A2 | 1/2011 |
| WO | 2011039501 A2 | 4/2011 |
| WO | WO2011039501 A2 | 4/2011 |
| WO | 2011058312 A2 | 5/2011 |
| WO | 2011058313 A2 | 5/2011 |
| WO | 2011058314 A1 | 5/2011 |
| WO | 2011058322 A2 | 5/2011 |
| WO | 2011067554 A1 | 6/2011 |
| WO | 2011076850 A1 | 6/2011 |
| WO | 2011079107 A2 | 6/2011 |
| WO | 2011141537 A1 | 11/2011 |
| WO | 2011148128 A1 | 12/2011 |

OTHER PUBLICATIONS

Meadows et al.; Seismic Detection of a Hydraulic Fracture from Shear-wave VSP Data at Lost Hills Field, California, Geophysics, vol. 59, No. 1 (Jan. 1994); p. 11-26.

* cited by examiner

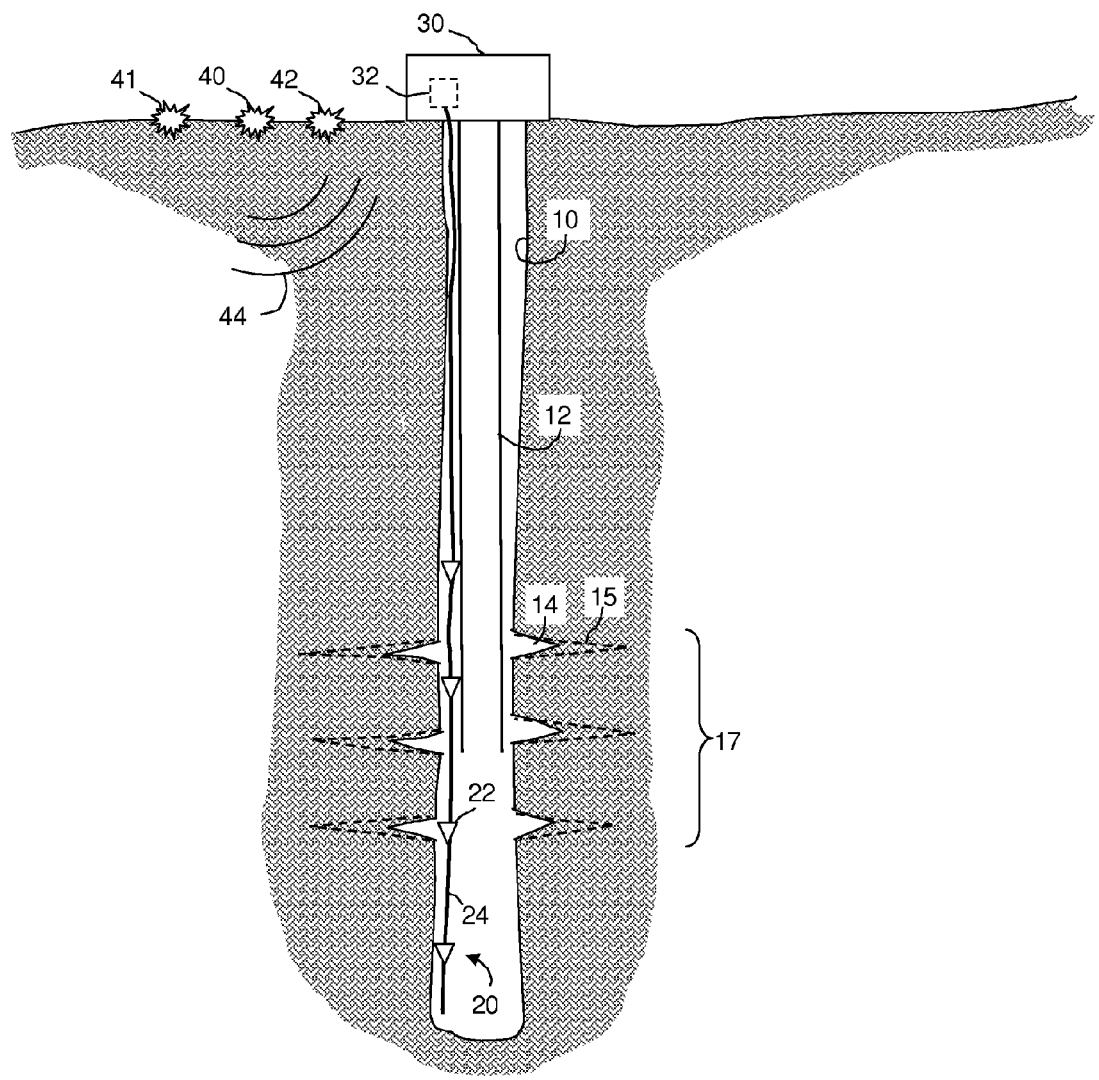

HYDRAULIC FRACTURE MONITORING USING ACTIVE SEISMIC SOURCES WITH RECEIVERS IN THE TREATMENT WELL

PRIORITY CLAIM

The present application which is a 371 application of PCT/US2012/041880, filed Jun. 11, 2012, claims priority from U.S. Provisional Application 61/496,280, filed Jun. 13, 2011.

RELATED CASES

Not applicable.

FIELD OF THE INVENTION

The invention relates to a system and method for monitoring hydraulic fracturing using vertical seismic profiling techniques.

BACKGROUND OF THE INVENTION

In the production of hydrocarbons from subsurface formations, it is common to "hydraulically fracture" a formation in order to increase its permeability, which in turn enhances its productivity. Typically, a fracturing fluid is injected under pressure into the formation through an injection well. In order to determine the effectiveness of a fracturing operation, it is desirable to gain information about the rate and extent of fracturing that occurs during the injection.

In water flooding operations, fluids are injected into the subsurface formation to mobilize the hydrocarbons towards producer wells. Such injection often needs to occur at high pressures, occasionally exceeding the fracture pressure and leading to unintended fracturing of the formation and fluids being injected "out of zone." This is an undesirable outcome that decreases the effectiveness of the water flood and may result in early water breakthrough at the producers or water entering other producing intervals or overlying formations. Thus, it is desirable to gain information about the rate and extent of fracturing that occurs during the water flooding.

Various techniques have been proposed for monitoring fracturing. One such technique uses passive seismic monitoring that depends on detection of the microseismic signals that result from hydraulic fracturing, as recorded in nearby observation wells or in the treatment well itself. This process provides information in real-time and depends on the existence, strength, and detectability of the microseismic signals. Thus, it remains desirable to provide a robust and inexpensive technique that gives accurate and meaningful information about fracture growth without these limitations.

SUMMARY OF THE INVENTION

In accordance with preferred embodiments of the invention there is provided a system and method for actively monitoring fracture growth that is not dependent on detection of microseismic signals. The invention includes the use of active-source, time-lapse seismic profiles to collect information about the extent and degree of fracturing in the subsurface and can be carried out using sensors in the treatment well, thus eliminating the need for a second well.

Vertical seismic profiling is a known technique for making seismic measurements using down-hole receivers. Vertical Seismic Profile (VSP) data are typically obtained by generating one or more shots from a seismic source located at one or more selected positions on the surface. The signal produced by each shot is detected at multiple locations along a borehole extending into the formation. The signals can be detected by multiple receivers in the borehole, or by a group of receivers that is moved along the borehole. The primary goal of a VSP is obtaining the subsurface reflectivity with high vertical resolution.

Cross-well seismic measurements are similar to VSP measurements, but are typically made using a seismic source that is moved along the length of a second well. The second well only needs to be close enough to the treatment well to allow seismic signals to travel from the source to the receivers in the treatment well.

In some embodiments, the invention provides a method for obtaining information about a hydraulic fracturing operation in a well, comprising the steps of a) providing at least one acoustic source and at least one acoustic sensor in the well; b) injecting fracturing fluid into the well so as to cause fractures in the surrounding formation; c) using the acoustic source to send an acoustic signal and using the acoustic receiver to receive the signal; d) repeating step c); and e) processing the received signal using a microprocessor so as to obtain information about the fractures. The acoustic source may be at the surface or in a second well. In preferred embodiments, at least one acoustic sensor is positioned in or below the fractured formation.

The information gained in step d) can be used for controlling the injection of fracturing fluid, for monitoring fracture growth, or for characterizing fractures. By way of example, the information so gained can be used to build or calibrate subsurface models.

The method may be carried out using a plurality of acoustic sensors and the sensors may comprise distributed acoustic sensors. At least some of the sensors may be cemented in an annulus in the well. Preferably, at least 100 sensors are provided and step c) is repeated after a time period greater than 1 minute and less than 10 minutes. Step c) is preferably repeated for at least 1 hour.

The method can be used to measure first-arriving acoustic waves and the information gained from the acoustic measurements can be used to detect out-of-zone injection. The acoustic data can also be used in a vertical seismic profile technique.

As used herein, the terms "above" and "below" shall be understood to refer to positions that are relatively nearer to or farther from, respectively, the earth's surface.

BRIEF DESCRIPTION OF THE DRAWINGS

For a more detailed understanding of the invention, reference is made to the accompanying Drawing, which is a schematic illustration of a seismic operation in accordance with one embodiment of the invention.

DETAILED DESCRIPTION OF A PREFERRED EMBODIMENT

Referring to the FIGURE, a wellbore 10 contains a length of tubing 12 and a sensor array 20. Wellbore 10 may be cased or un-cased and there may or may not be cement in the annulus adjacent to the borehole wall. Without affecting the concepts disclosed herein, well 10 may contain one or more components such as are known in the art, including but not limited to packers, guide shoes, float shoes, float collars, stage collars, multiple tubing strings, sandscreens, perforating guns, etc (all not shown), and one or more zones in the well may be cemented or otherwise sealed or isolated. As discussed below, the well is subjected to a hydraulic fracturing force that causes fractures 14 in the formation surrounding the borehole. During fracturing, fractures 14 grow outwardly from the well, as shown in phantom by reference numeral 15. The portion of the formation in which fractures 14 are formed will be referred to as the fracture zone 17.

Sensor array 20 preferably includes a plurality of acoustic sensors 22 that are spaced-apart in the borehole and connected by a communication line 24. Sensors 22 can be geophones, including 3C geophones, hydrophones, or distributed acoustic sensors, all of which are known in the art. If sensors 22 are distributed acoustic sensors, communication line 24 may comprise an optical fiber with or without Bragg gratings and may serve as the sensing array, with or without additional discrete sensors. Sensors 22 can be positioned above, throughout, and/or below fracture zone 17.

Sensors that are above the fracture zone can only give information about fracturing using reflected or diffracted waves, not first arrivals, whereas, sensors that are in or below the fracture zone can give information about the extent of fracturing using first arrivals.

At the surface, various equipment and controls such as are known in the art are shown schematically at 30. Surface equipment 30 preferably includes signal-receiving means 32 for sensors 22. If sensors 22 are distributed acoustic sensors, signal-receiving means 32 may include a lightbox with a computer-controlled laser light source that is optically coupled to an optical fiber and an optical receiver for detecting light that has been backscattered from points within the fiber. Acoustic waves that are incident on the optical fiber cause perturbations in the fiber that can be detected optically using optical time domain reflectometry (OTDR), interferometry, or combinations thereof.

Still referring to the FIGURE, at least one source 40 may be positioned on the surface of the earth, near enough to wellbore 10 to allow seismic signals from source 40 to be received at sensors 22. If desired, several seismic sources 41, 42 may be provided at different positions relative to the wellbore in order to provide more complete coverage.

In operation, seismic (acoustic) signals 44 are generated from at least one source 40 on the earth's surface and are received at down-hole receivers 22. According to preferred embodiments receivers 22 are and preferably deployed along a significant portion of the length of wellbore 10. This type of seismic measurement is known as VSP. In preferred embodiments, receivers are located above, through, and below the fracture zone, as this configuration typically gives better results. In particular, seismic signals travelling from the surface sources to the sensors in the well can be detected as first arrivals.

The seismic signals are preferably generated frequently, e.g. every few minutes, while the hydraulic fracturing is taking place. The seismic signals may begin before the fracturing operation commences and may continue after it ends (e.g., to record the effects of pressure dissipation or leak-off). It is preferred to acquire a baseline survey prior to beginning the injection of hydraulic fracturing fluid. By way of example only, it may be desirable to send an acoustic signal once per minute and to record acoustic data for at least an hour. In preferred embodiments, acoustic data may be recorded less frequently, e.g. with a frequency less than 1 per minute and greater than 1 per 10 minutes, and is recorded throughout the fracturing operation.

As the injection proceeds and seismic surveys are acquired every few minutes, receivers above the fracture zone will not record any changes in times and amplitudes of first arrivals. In contrast, receivers in and below the fracture zone will record changes in first arrivals over time, depending on the extent of fracturing occurring in the rocks adjacent to the well.

Using the data from receivers above the area of interest as reference, for instance via deconvolution, it is possible to isolate changes in arrival times and amplitudes that are attributable solely to the fracture zone and not the overburden. By way of example only, this can be accomplished using VSP first-arrival tomography or simpler methods. Reflected and diffracted waves may also be used, including those arriving at sensors above the fracture zone. It will be understood that the data-processing techniques described herein are performed on a microprocessor and are known in the art. In instances where there are no sensors above the fracture zone, first arrival data may not be available for the overburden, with the result that overburden calculations may have to be made using techniques that are known in the art.

The resulting seismic data provide information about the rate and extent of subsurface fracturing. This information, in turn, can be used as an input in controlling the rate of injection of fracturing fluid, in monitoring fracture growth, or for characterizing fractures, as well as ensuring that fractures do not extend beyond the intended fracture zone. Likewise, the information about fracture growth can be used to build or calibrate subsurface models.

While VSP techniques can be implemented with any type of sensor array, in some instances it may be preferred to use a distributed acoustic sensing (DAS) system. DAS is particularly suitable for VSP because it readily provides a large sensor array with minimal or no well intervention and because the nearly vertically incident P and nearly-horizontally incident Sv waves are readily detectable using DAS fiber.

For energy arriving along the wellbore, the known technique of virtual source imaging may be used to remove the effects of the overburden. The effect of fracturing on first-arriving waves will be seen on time delays (time shifts) and amplitude changes, presumably on both P and S waves.

While DAS favors along-well wave propagation for P waves, if signal and sensitivity are great enough, P waves approaching broadside can be used. Such waves could be generated, for example, by sources arranged in a circle around the fracturing operation, far enough distant to favor horizontal propagation by turning, so as to give a measure of fracture azimuth and height. By way of example only, this may entail positioning the sources such that a direct path between a source and a receiver in the well defines an angle of at least 60° from vertical. In addition, Sv waves, polarized vertically, could also be arranged to propagate horizontally in a similar way, and these waves could provide fracture height and azimuth without requirement of abnormally strong signal or sensitivity.

In alternative embodiments, a fracturing operation may be monitored using both active and passive seismic systems simultaneously. Thus for example, with receivers in the same well, the signals from active and passive seismic would provide complementary information: passive seismic signals are indicative of fracturing of the rock, while active seismic signals respond to the presence of injection fluids and general weakening of the surrounding rock.

In still other embodiments, one or more seismic sources could alternatively or additionally be positioned in a nearby observation well, resulting in a cross-well geometry. This configuration is a more intrusive and more complex application, and results in broadside arriving waves, disfavoring use of DAS for P waves, which are more effectively measured using transversely-oriented or 3C geophones. Nonetheless, DAS will be effective for recording $S_v$ waves in this geometry. Cross-well tomography techniques are known in the art.

In instances where there are no sensors in or below the fracture zone, first arrival data may not be available for the fracture zone, with the result that data analysis for the fracture zone may have to be made using reflections or diffraction.

In any of the embodiments, the concepts disclosed herein can be used to monitor water flooding operations and to detect out-of-zone water injection.

Laboratory experiments and field data suggest that time-lapse effects may be more apparent for shear waves than for compression waves, but both wave types are of interest in hydraulic fracture characterization. In addition, with sources at the surface, well separated from the fracture, diffraction phenomena also become important in the interpretation. If it is desirable to measure shear waves, then a seismic source that emits such waves is important. For surface sources, both dynamite and vibrating sources (vibroseis) can provide shear energy, but not necessarily in a coherent manner or with sufficient strength at the depths of interest. Virtual source processing may be used to synthesize shear sources distributed along the well from the wavefield produced by strong surface sources. A strong Seismovie™ source might give good shear energy and avoid the near-surface attenuation difficulties. PS conversions can also produce deep shear energy.

While the invention has been described in terms of preferred embodiments, it will be understood that variations and modifications can be made without departing from the scope of the invention which is set out in the claims that follow. In the claims, unless explicitly so stated, the sequential recitation of steps is not intended to require that the steps be performed in the recited order. In particular, except as stated, the timing of the beginning, end, and duration of the injection of fracturing fluid has no bearing on the scope of the claims, which relate to the collection of seismic data Likewise, the processing of data may be concurrent with the collection of additional data, data collected at various times may be processed separately or together, data may be processed more than once and/or in more than one way, and/or data processing can be performed after the collection of all data.

The invention claimed is:

1. A method for obtaining information about a hydraulic fracturing operation in a fracture zone in a well, comprising the steps of:
    a) providing a plurality of acoustic sensors in the well and at least one acoustic source;
    b) injecting fracturing fluid into the well so as to cause fractures in a fracture zone in the surrounding formation;
    c) using the acoustic source to send an acoustic signal and using the acoustic sensors to receive the signal;
    d) repeating step c) at least once;
    e) processing the received signals using a microprocessor so as to obtain information about the fractures; and
    f) outputting the obtained information;
    wherein at least one acoustic sensor is in or below the fracture zone and the received signal is a first arrival and wherein at least one additional sensor is above the fracture zone, and further including the step of using deconvolution or virtual source processing on the signals received at the sensors to isolate changes in the formation from changes in the overburden.

2. The method according to claim 1 wherein step c) is carried out at least once before step b) begins.

3. The method according to claim 1, wherein the source is at the earth's surface.

4. The method according claim 1, wherein the source is in a second well.

5. The method according to claim 1, further including a step of
    g) using the information gained in step e) to either control the injection of fracturing fluid or detect out-of-zone water injection.

6. The method according to claim 1, wherein at least some of the plurality of acoustic sensors are cemented in an annulus in the well.

7. The method according to claim 1, wherein at least 100 acoustic sensors are provided.

8. The method according to claim 1, wherein step c) is repeated after a time period less than 10 minutes.

9. The method according to claim 1, wherein step c) is repeated during a time period of at least 1 hour.

10. The method according to claim 1, wherein step e) comprises measuring first-arriving acoustic waves.

11. The method according to claim 1, wherein step e) comprises measuring reflected or diffracted acoustic waves.

12. The method according to claim 1, wherein a plurality of acoustic sources are arranged around the well.

13. The method according to claim 1, wherein the at least one acoustic source is far enough from the well to favor horizontal propagation by turning so as to give a measure of fracture azimuth and height.

14. The method according to claim 1, wherein the at least one acoustic source is far enough from the well to favor horizontal propagation by turning so as to give a measure of fracture azimuth and height.

* * * * *